Patented June 17, 1941

2,246,425

UNITED STATES PATENT OFFICE 2,246,425

PRODUCTION OF DIAZOTYPE REFLEX COPIES

Gottlieb von Poser and Maximilian Paul Schmidt, Wiesbaden-Biebrich, Germany, assignors to Kalle & Co. Aktiengesellschaft, Wiesbaden-Biebrich, Germany No Drawing. Application May 29, 1939, Serial No. 276,420. In Germany June 18, 1938

12 Claims. (Cl. 95—5)

The present invention relates to the production of reflex copies by means of diazotype material.

It has already been proposed to produce reflex copies with the help of diazo compounds. The known processes still have, however, various disadvantages. Thus, in order to obtain reflex copies rich in contrast, it is generally necessary when reflex-copying to interpose filters or screens. This is inconvenient and moreover screens are expensive and sensitive, and in the same way as filters they absorb much light. The diazo compounds suggested hitherto for reflex photography without the use of filters or screens do not give reflex copies which satisfy practical requirements.

The present invention relates to the production of reflex copies wherein the said drawbacks are avoided. It has been found that reflex copies rich in contrast can also be produced without the use of screens or filters if colorless or practically colorless diazo compounds, and in particular colorless diazo compounds of the benzene series are employed. This was surprising as colorless diazo compounds had hitherto been considered unsuitable for diazo-types and had acquired no practical importance.

Colorless diazo-phenol ethers, that is compounds which are obtained by the diazotization of the p-anisidine or o-anisidine, phenetidines and similar ethers of amino phenols are very suitable as diazo compounds. The diazo-phenol alkyl-ethers especially the para compounds are particularly well suitable. The alkoxy groups in these alkyl ethers preferably contain not more than five carbon atoms. However, also phenoxy groups or other aryloxy groups of the benzene series come into consideration as ether groups.

The diazo-phenol ethers can also contain several ether groups, particularly alkoxy groups, such as methoxy- or ethoxy-groups. Thus compounds derived from resorcin and which contain, for example, a diazo group in the para-position to one of the etherized oxy-groups of resorcin are very suitable, since particularly stable light sensitive layers are produced with them.

Also many unetherized colorless diazo-phenols, for example the diazo compound of 4-amino-1-phenol come into consideration for the process of the invention. The diazo-phenol ethers, however, have proved better. The said diazo-phenols and also the said diazo-phenol ethers can also contain further substituents, for example, sulphonic groups, carboxylic groups and alkyl groups, as for instance methyl groups.

Also other stable diazo compounds of the benzene series which are colorless, for example, the diazo compounds of sulphanilic acid or of 6 - amino - 2-methyl-pseudo-azimidobenzene are useful as diazo compounds, according to the invention.

Preferably the diazo compounds employed according to the invention are used in combination with azo components which with them lead to yellow to greenish yellow dyes which strongly absorb the light of the wave band of 3500–3900 A. It is advantageous if the chief absorption of the dyes extends over the said region. In this way, reflex copies are obtained which can be recopied particularly well on normal diazo printing paper and at the same time provide copies extraordinarily rich in contrast.

In addition to phenol itself there comes into question in particular, as azo components, derivatives of phenol which preferably contain only one phenolic hydroxyl group. Water-soluble phenol derivatives are particularly well suitable. Suitable azo components are described in our copending patent application Serial No. 200,162 of 1938. Resorcin is also useful in many cases as azo component. Further suitable azo components may easily be found among the azo components useful in the production of yellow color tones known in dyestuff chemistry.

By the photography of the absorption spectrum of the dyes produced with azo components and colorless diazo compounds it can be easily ascertained which of the diazo compounds or azo components may be suitably combined with each other. Combinations of diazo compounds of resorcin dialkylethers with alkyl phenols and, above all, methyl phenols, which preferably contain a residue increasing water-solubility bonded with an alkyl group, have proved to be particularly suitable. Further suitable combinations are described in the examples.

With the light-sensitive layer according to the invention there are used as carriers structureless transparent films, for example, cellulose hydrate or gelatine sheets, which are saturated with or coated with the solutions of the diazo compounds. These solutions may already contain the azo components; they may also contain additions which stabilize the films or the pictures produced therewith, such as, for example, metal salts or aryl sulphonic acids. In order to be able to carry out the copying process still better, other compounds, for example such as bleaching dyes, may be added to the layers.

When copying on the material according to the invention, arc lamps or mercury vapor lamps are preferably used as the source of light.

Filters or screens may also be interposed although this does not, as a rule, carry with it any particular advantage.

For re-copying the reflex copies diazo printing papers which carry a particular strong light-sensitive layer are preferably used.

Examples (1) A film of regenerated cellulose is saturated with a solution which contains in 1 liter of water 14 grams of the tin chloride double salt of the diazo compound from 4-ethoxy-1-amino-benzene together with 15 grams of citric acid and 8 grams of phenol. For the production of a reflex copy a sheet prepared in this way is placed on the original to be copied and is submitted in the usual way to the light of an arc lamp or mercury vapor lamp until the diazo compound has decomposed at the parts of the sheet opposite the white parts of the original. The sheet is then developed, in known manner, with ammonia vapor and shows a yellow positive image of the original which is very suitable for the production of legible copies with the help of the normal diazo print materials.

(2) A film of regenerated cellulose is coated on one side with a solution containing 80 grams of tin chloride double salt of the diazo compound of 4-methoxy-1-amino-benzene, 40 grams of citric acid and 55 grams of the sodium salt of 2-hydroxy-1-benzene-sulphonic acid in 1 liter of water. In the production of a reflex copy with this material the prepared side of the film is brought into contact with the original to be copied. The further treatment is carried out as stated in Example 1.

(3) An acetyl cellulose film is saponified on one side and then on the saponified side is coated with a solution which contains 140 grams of the zinc chloride double salt of the diazo compound from 2.4-dimethoxy-1-aminobenzene, 100 grams of citric acid and 110 grams of 2.5-dimethyl-6-ω-dimethylaminomethyl-1-phenol in 1 liter of water. With this film yellow reflex copies are obtained which recopy particularly well on normal diazo printing paper.

(4) A cellulose hydrate film is saturated with a solution which contains in 1 liter of water 15 grams of the diazo compound from the 2.4-dimethoxy - 1 - aminobenzene-5-sulphonic acid, 12 grams of citric acid, 20 grams of zinc chloride and 10 grams of β-(4-methyl-2-oxyphenyl)-glutaric acid. To the solution can be added .3 gram methylene blue BB. When exposed to light the methylene blue bleaches out and therefore shows the moment at which the diazo compound which is colorless has also bleached out. The material is very useful for the production of reflex copies. Instead of the mentioned diazo compound also the diazonium chlorobenzene sulphonic acid salt from 2.4-dimethoxy-1-aminobenzene-6-carboxylic acid may be employed, for instance together with the acetoacetic acid anilide as azo component.

(5) A cellulose hydrate film is saturated with a solution which contains in 1 liter of water 32 grams of zinc chloride double salt of the diazo compound from 5-methyl-2-methoxy-1-aminobenzene, 20 grams of tartaric acid and 20 grams of 3-hydroxy-4-methoxy-1-hydroxymethylbenzene. With the film yellow reflex copies are obtained which can be easily copied.

(6) A solution is used containing 25 grams of diazotized sulphanilic acid, 40 grams of tartaric acid and 17 grams of 2.5-dimethyl-6-ω-dimethyl-aminomethyl-1-phenol in 1 liter of water for sensitizing a reflex copying material. The said azo component is obtained by condensation of 1.4-dimethyl-2-oxybenzene with equimolecular quantities of formaldehyde and dimethylamine.

(7) An acetyl cellulose foil saponified on one side is coated with a solution of 160 grams of zinc chloride double salt of the diazo compound from 2.4-dimethoxy-1-aminobenzene and 80 grams of citric acid in 1 liter of water. A reflex copy produced with this material is developed using a sponge or one of the usual moist developing devices with a solution containing in 1 liter of water 80 grams of 3-methyl-5-pyrazolone, 40 grams of soda and 1 gram of saponine. A yellow image is formed.

(8) An acetyl cellulose film corresponding to Example 7 is coated with a solution of 90 grams of the tin chloride double salt of the diazo compound from 4-amino-1-phenol and 60 grams of critric acid in 1 liter of water. The development of a reflex copy obtained on the material is effected with a solution containing 90 grams of resorcin, 110 grams of soda and 1 gram of saponine in 1 liter of water.

(9) A cellulose hydrate foil is soaked with a solution which contains in 1 liter of water 10 grams of the zinc chloride double salt of the diazo compound from 4-methoxy-3-methyl-1-aminobenzene, 20 grams of citric acid and 10 grams of resorcin monomethylether sulphonic acid. This product is obtained by sulphonating the resorcin monomethylether with chlorosulphonic acid in carbon tetrachloride. The sensitized material has a particularly good stability.

(10) 15 grams of the zinc chloride double salt of the diazo compound from 4-phenoxy-1-aminobenzene, 4 grams of m-cresol and 20 grams of tartaric acid are dissolved in a mixture of 900 ccm. of water and 100 ccm. of ethyl alcohol. With this solution a reflex copying material is sensitized.

(11) 20 grams of the zinc chloride double salt of the diazo compound from 3.4-dimethoxy-1-aminobenzene, 20 grams of tartaric acid and 15 grams of β-(4-methyl-2-oxyphenyl) glutaric acid are dissolved in 1 liter of water. Light sensitive reflex copying materials produced with this solution need only a short exposure to light.

We claim:

1. In a process for producing a reflex copy the steps which comprise placing a structureless transparent film sensitized by means of a substantially colorless diazo-phenol dialkyl ether carrying one of its two alkoxy groups in para-position to the diazo group and the other alkoxy group in ortho position to the diazo group upon the original which is to be copied, causing light to fall upon the original through the said light-sensitive material, developing the image thereon and reproducing the developed image on a diazo-photo printing material by direct contact methods.

2. In a process for producing a reflex copy the steps which comprise placing a structureless transparent film containing a substantially colorless diazo compound of the benzene series as light-sensitive substance and an azo component yielding on development a yellow to greenish yellow dye with the said diazo compound which dye strongly absorbs the light of the wave band of 3500–3900 Å. upon the original which is to be copied, causing light to fall upon the original through the said light-sensitive material, developing the image thereon and reproducing the developed image on a diazo-photo printing material by direct contact methods.

3. In a process for producing a reflex copy the steps which comprise placing a structureless transparent film containing a substantially colorless diazo-phenol ether as light-sensitive substance and an azo component yielding on development a yellow to greenish yellow dye with the said diazo compound which dye strongly absorbs the light of the wave band of 3500–3900 Å. upon the original which is to be copied, causing light to fall upon the original through the said light-sensitive material, developing the image thereon and reproducing the developed image on a diazo-photo printing material by direct contact methods.

4. In a process for producing a reflex copy the steps which comprise placing a structureless transparent film containing a substantially colorless diazo compound of the benzene series as light-sensitive substance and an azo component of the benzene series which contains not more than one phenolic hydroxyl group yielding on development a yellow to greenish-yellow dye with the said diazo compound, which dye strongly absorbs the light of the wave band of 3500–3900 Å. upon the original which is to be copied, causing light to fall upon the original through the said light-sensitive material, developing the image thereon and reproducing the developed image on a diazo-photo printing material by direct contact methods.

5. In a process for producing a reflex copy the steps which comprise placing a structureless transparent film containing a substantially colorless diazo-phenol ether as light-sensitive substance and an azo component of the benzene series which contains not more than one phenolic hydroxyl group yielding on development a yellow to greenish-yellow dye with the said diazo compound, which dye strongly absorbs the light of the wave band of 3500–3900 Å. upon the original which is to be copied, causing light to fall upon the original through the said light-sensitive material, developing the image thereon and reproducing the developed image on a diazo-photo printing material by direct contact methods.

6. In a process for producing a reflex copy the steps which comprise placing a structureless transparent film containing a substantially colorless diazo-phenol ether as light-sensitive substance and as azo component an alkyl phenol which contains only one phenolic hydroxyl group in the benzene nucleus yielding on development a yellow to greenish-yellow dye with the said diazo compound, which dye strongly absorbs the light of the wave band of 3500–3900 Å. upon the original which is to be copied, causing light to fall upon the original through the said light-sensitive material, developing the image thereon and reproducing the developed image on a diazo-photo printing material by direct contact methods.

7. In a process for producing a reflex copy the steps which comprise placing a structureless transparent film containing the diazo compound of 1-amino-2.4-dimethoxybenzene as light-sensitive substance and the 2.5-dimethyl-6-$\omega$-dimethyl-aminomethyl-1-phenol as azo component upon the original which is to be copied, causing light to fall upon the original through the said light-sensitive material, developing the image thereon and reproducing the developed image on a diazo-photo printing material by direct contact methods.

8. In a process for producing a reflex copy the steps which comprise placing a structureless transparent film containing the diazo compound of 2.4-dimethoxy-1-aminobenzene-5-sulphonic acid as light-sensitive substance and the $\beta$(4-methyl-2-oxyphenyl)-glutaric acid as azo component upon the original which is to be copied, causing light to fall upon the original through the said light-sensitive material, developing the image thereon and reproducing the developed image on a diazo-photo printing material by direct contact methods.

9. In a process for producing a reflex copy the steps which comprise placing a structureless transparent film containing the diazo compound of 4-methoxy-3-methyl-1-aminobenzene as light-sensitive substance and the resorcin monomethylether sulphonic acid obtained by sulphonating the resorcin monomethylether by means of chlorosulphonic acid as azo component upon the original which is to be copied, causing light to fall upon the original through the said light-sensitive material, developing the image thereon and reproducing the developed image on a diazo-photo printing material by direct contact methods.

10. As a new product a structureless cellulose hydrate film containing the diazo compound of 1-amino-2.4-dimethoxybenzene as light-sensitive substance and the 2.5-dimethyl-6-$\omega$-dimethyl-amino-methyl-1-phenol as azo component.

11. As a new product a structureless cellulose hydrate film containing the diazo compound of 2.4-dimethoxy-1-aminobenzene-5-sulphonic acid as light-sensitive substance and the $\beta$(4-methyl-2-oxyphenyl)-glutaric acid as azo component.

12. As a new product a structureless cellulose hydrate film containing the diazo compound of 4-methoxy-3-methyl-1-aminobenzene as light-sensitive substance and the resorcin monomethylether sulphonic acid obtained by sulphonating the resorcin monomethylether by means of chlorosulphonic acid as azo component.

GOTTLIEB von POSER.
MAXIMILIAN PAUL SCHMIDT.